Nov. 5, 1935.   D. KNIES   2,020,034
SAND CONDITIONING APPARATUS
Filed Dec. 31, 1931   2 Sheets-Sheet 1
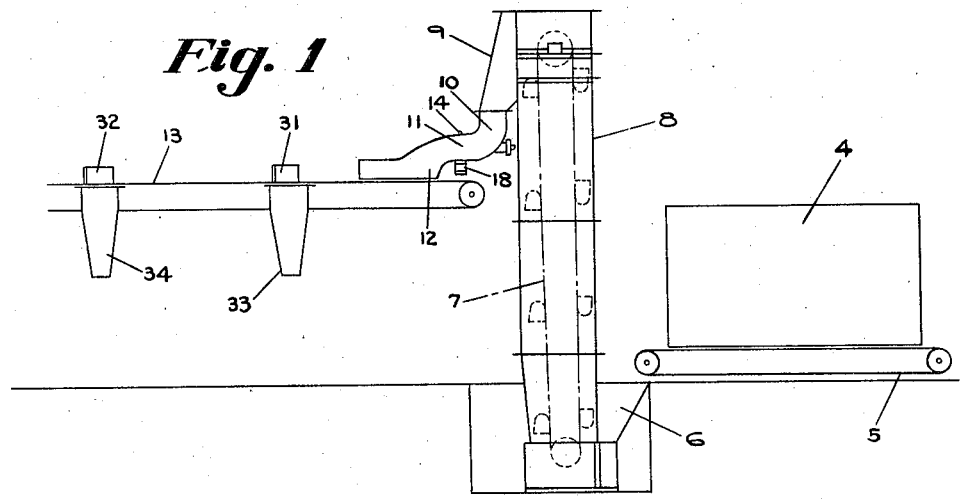
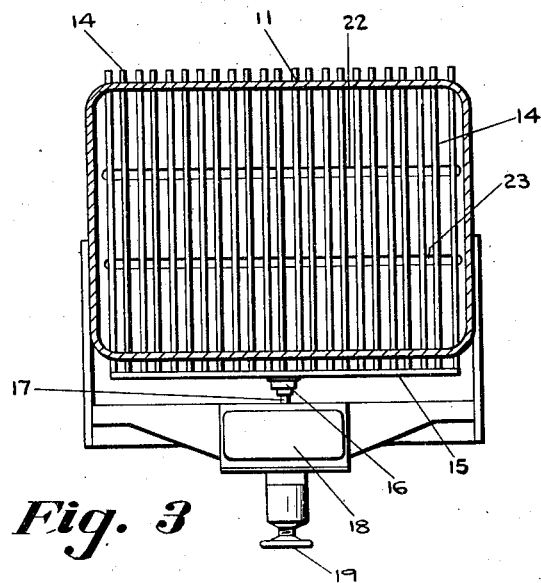
INVENTOR
Daniel Knies
By
Chas. M. Niesen,
ATT'Y.

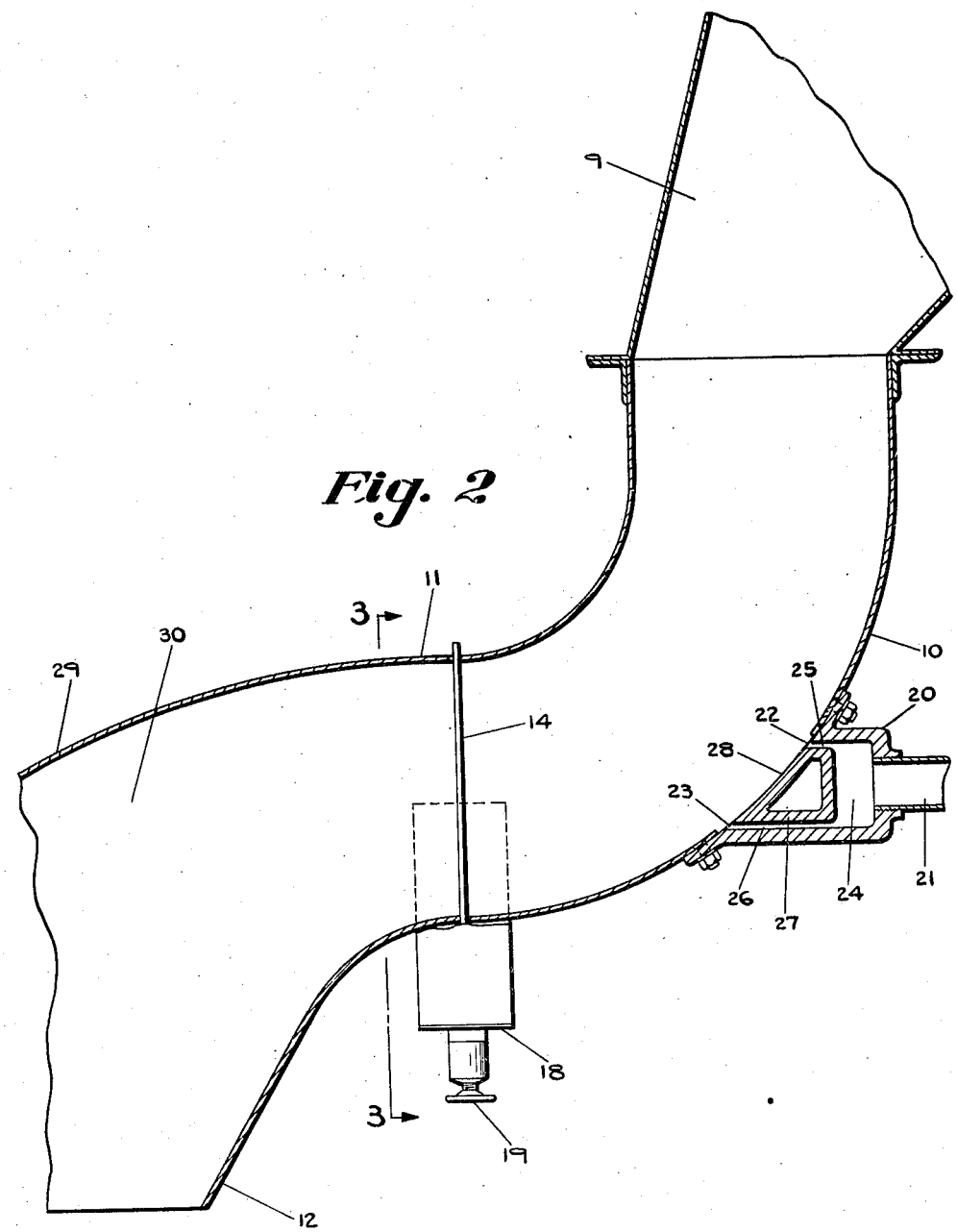

Patented Nov. 5, 1935

2,020,034

UNITED STATES PATENT OFFICE 2,020,034

SAND CONDITIONING APPARATUS

Daniel Knies, Columbus, Ohio, assignor to The Jeffrey Manufacturing Company, a corporation of Ohio Application December 31, 1931, Serial No. 584,187

6 Claims. (Cl. 83—46)

My invention relates to sand conditioning apparatus and one of its objects is to provide an improved and efficient system comprising means for receiving used molding sand, elevating the same to a hopper, aerating and disintegrating the lumps while passing through a chute and finally delivering the reconditioned sand from a delivery nozzle having a widely expanded mouth, to a conveyor for transfer to hoppers in position for delivery to molding machines.

Another object of the invention is to provide an upright disintegrator in a chute and connecting an air blast nozzle to the chute to direct a forced draft against said disintegrator.

A further object of the invention is to provide for a disintegrator in a chute a horizontal stratum of forced draft to effect churning of lumps of granular material against the disintegrator between the top and bottom thereof until aerated, dried and disintegrated.

Another object of the invention is the provision of an air blast nozzle having an elongated slot adapted to direct a stratum of forced air draft against a transverse disintegrator in a chute.

A further object of the invention is the provision of a delivery nozzle having a lower widely expanded mouth and which will serve as an expansion and aerating chamber for the granular material passing into such nozzle.

Other objects of the invention will appear hereinafter, the novel features and combinations being set forth in the appended claims.

In the accompanying drawings,

Fig. 1 represents diagrammatically my improved system embodying the features of my invention;

Fig. 2 is an enlarged sectional elevation of the disintegrator and air blast nozzle combined for operation to aerate and recondition used molding sand; and Fig. 3 is a sectional view taken on the line 3—3 of Fig. 2 looking in the direction of the arrows.

In Fig. 1 a hopper for used molding sand is shown at 4. Such sand when delivered from the hopper 4 will be directed onto the endless conveyor 5 for transfer to the bin 6 from which it can be elevated by means of the bucket conveyor 7 in the tower 8 for delivery to the hopper 9.

To the lower end of the hopper 9, as shown in Fig. 2, is connected a chute comprising an elbow 10 and a horizontal section 11. The horizontal section 11 may merge into the delivery nozzle 12 which has an open mouth at its lower side of a width commensurate with the width of the endless traveling conveyor 13.

Extending vertically transversely of the section 11 is a disintegrator which may be a screen, grid or grating. In Figs. 2 and 3 I have shown a grating comprising vertical rods 14, 14 which are slidable through spaced apart holes in the upper and bottom walls of the horizontal section 11 of the chute. The spacing of the vertical rods may be varied in accordance with the sizes of the lumps of sand which are to be disintegrated or broken up into separated granules.

To the lower ends of the rods 14 is connected a universal cross-bar 15 and to the center of this cross-bar at 16 is connected the armature post 17 of an electrically operated vibrator 18 which may be of any suitable type such as that shown, for example, in the patent to Reynolds, 1,479,834, granted January 8, 1924, for an Improvement in screening apparatus. The intensity of vibration of the grating 14 may be regulated by the positioning of the wheel 19.

At that portion of the elbow 10 where the buckets of sand fall intermittently during the operation of the elevator 7, I have connected an air blast nozzle 20 having a supply pipe 21 leading thereto. The nozzle 20 is particularly constructed to have superposed elongated slots 22, 23 as shown in Fig. 3. The compressed air from the supply pipe 21 first enters the chamber 24 and then branches into the flat horizontal channels 25, 26 above and below the spacing member 27. The inner wall 28 of the spacing member 27 is flush with the inner adjacent walls on the interior of the elbow 10.

I prefer to construct the nozzle so that it will have the flat channels 25, 26 and the elongated outlet ports 22, 23. The forced draft will then be in horizontal superposed strata against the grating, screen or grid 14 so that before lumps of sand can descend to the bottom of the elbow they will be thrown forcibly against the disintegrator and rolled about or churned, aerated and separated into granules and then forcibly swept against the upper deflector wall of the delivery nozzle 12.

If the blast of air is insufficient to waft the heavier lumps of sand against the grating and such lumps fall to the lower wall or floor of the horizontal section of the chute near the lower ends of the bars or rods 14, the forced draft will nevertheless aerate the sand and dry the same sufficiently to separate the granules and cause them to move through the grating.

Any sand which sticks to the bars or rods 14 by reason of moisture or otherwise will be shaken off by means of the electric vibrator 18. The vertical vibration of these bars will also assist in disintegrating the lumps of sand which may accumulate on the bottom or floor of the chute in front of the lower ends of the bars or rods 14.

It should also be observed that the narrow elongated slots or outlets 22, 23 extend almost entirely across the elbow of the chute so that the entire cross-sectional area of the chute will be subjected to the blasts of air in superposed strata.

After the sand passes through the grating it enters the enlarged chamber 30. This chamber serves as an expansion chamber to enable the moisture on the sand to be completely evaporated. The dry sand in the form of completely separated granules then passes downwardly in accordance with the deflection effected by the deflector wall 29 and is ejected from the widely expanded mouth on the lower side of the nozzle 12 onto the belt conveyor 13, or a bin or other receptacle.

By means of adjustable deflectors 31 and 32 the sand on the belt 13 may be directed either to the hopper 33 or the hopper 34 for flow into molding machines.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention what I desire to have protected by Letters Patent of the United States is:—

1. In apparatus for treating granular material, the combination with a chute having an elbow, of an upright grating extending transversely of said chute, an air blast nozzle connected to said elbow to direct a blast of air toward and through said grating, and means for vibrating said grating while granular material is passing through said chute by gravity and said blast of air is forcibly wafting said material against said grating to disintegrate lumps thereof.

2. In apparatus for treating granular material, the combination with a chute having an elbow, of an air blast nozzle connected to said elbow and comprising a pair of spaced-apart horizontal slots, a grating mounted in an upright position across a horizontal section of said chute, and means for vibrating said grating transversely of said chute while air blasts are directed from said elongated slots toward said grating and while granular material is falling into said elbow by gravity.

3. In apparatus for treating granular material, the combination with a chute, of disintegrating means extending vertically across said chute, and an air blast nozzle having a plurality of superposed spaced apart elongated horizontal slots to direct corresponding strata of forced draft against said disintegrating means to churn lumps of such material against such disintegrating means.

4. In sand conditioning apparatus, the combination with a hopper for receiving the sand, of a horizontal chute, an elbow connecting said hopper and said horizontal chute, a widely expanded delivery nozzle having an opening on its lower side and serving as an expansion chamber for the sand after passing through said chute, a disintegrator extending vertically across said chute, means for vibrating said disintegrator, and means for producing horizontal strata of blasts of air against said disintegrator at different elevations.

5. In a system for treating molding sand and delivering the same to molding machines, the combination with a receptacle for used molding sand, of a bin, a conveyor for transferring sand from said bin, a hopper, an elevator for hoisting the sand to said hopper, a delivery nozzle having a widely expanded lower mouth open to the atmosphere, an elbow connecting said hopper and said nozzle, a transverse disintegrator between said elbow and said nozzle, an air blast nozzle in said elbow and directed toward said disintegrator, a conveyor for receiving the sand from said delivery nozzle, and a hopper for receiving the sand from said conveyor.

6. Apparatus for treating granular material comprising the combination with a chute having aligned upper and lower openings, of a disintegrator within the chute comprising upright spaced bars extending through the said openings, a universal cross bar connecting the said upright bars, and means for vertically vibrating the cross bar to impart vertical vibrations to the upright bars for dislodging material adhering thereto.

DANIEL KNIES.